(12) United States Patent
Leizer

(10) Patent No.: US 10,589,754 B2
(45) Date of Patent: Mar. 17, 2020

(54) TRAIN PLATFORM LOCATED SECURITY SYSTEM

(71) Applicant: Tal Leizer, Gan Yavne (IL)

(72) Inventor: Tal Leizer, Gan Yavne (IL)

(73) Assignee: Tal Leizer, Gan Yavne (IL)

( * ) Notice: Subject to any disclaimer, the term of this patent is extended or adjusted under 35 U.S.C. 154(b) by 0 days.

(21) Appl. No.: 16/063,274

(22) PCT Filed: May 9, 2016

(86) PCT No.: PCT/IL2016/050487
§ 371 (c)(1),
(2) Date: Jun. 17, 2018

(87) PCT Pub. No.: WO2017/195185
PCT Pub. Date: Nov. 16, 2017

(65) Prior Publication Data
US 2019/0084586 A1    Mar. 21, 2019

(51) Int. Cl.
*B61B 1/02* (2006.01)
*H04W 4/02* (2018.01)

(52) U.S. Cl.
CPC ............ *B61B 1/02* (2013.01); *H04W 4/023* (2013.01)

(58) Field of Classification Search
CPC . B61B 1/00; B61B 1/005; B61B 1/02; H04W 4/023
See application file for complete search history.

(56) References Cited

U.S. PATENT DOCUMENTS

| | | | | |
|---|---|---|---|---|
| 4,048,755 A | * | 9/1977 | Wolak | B61D 19/00 49/130 |
| 6,360,668 B1 | * | 3/2002 | Rauch | B61B 1/02 104/30 |
| 7,721,653 B1 | * | 5/2010 | Burgess | B61B 1/02 104/27 |

(Continued)

FOREIGN PATENT DOCUMENTS

| | | |
|---|---|---|
| CA | 2644794 | 5/2010 |
| CN | 2398152 Y | 9/2000 |

(Continued)

*Primary Examiner* — Jason C Smith
(74) *Attorney, Agent, or Firm* — Shalev, Jencmen & Co.

(57) ABSTRACT

A dynamic train platform located security system comprises a single expanse of interconnectable and longitudinally displaceable, vertical barriers for isolating a passenger waiting area at a train station from a platform edge area, including at least two longitudinally spaced and openable portal modules for permitting passage through a corresponding central opening; and a control system for causing the single expanse to be longitudinally displaced in unison, in response to a detected stop position of a train that has arrived at the station, until each portal module central opening is aligned with corresponding doors of the arrived train. In one embodiment, the system further comprises, in conjunction with a drive unit for initiating controlled and aligned movement, a passageway directly extending from a corresponding portal module central opening to a door of the arrived train and over which elderly and handicapped passengers are able to walk without having to climb stairs.

12 Claims, 13 Drawing Sheets

(56) References Cited

U.S. PATENT DOCUMENTS

| | | | | |
|---|---|---|---|---|
| 7,784,406 B2* | 8/2010 | Chisena | ............ | B61K 13/04 104/28 |
| 8,109,214 B2* | 2/2012 | Bradley | ............ | B61B 1/02 104/28 |
| 8,387,541 B2* | 3/2013 | Losito | ............ | B61B 1/02 104/28 |
| 9,452,761 B2* | 9/2016 | Romero | ............ | B61B 1/02 |
| 2013/0091771 A1* | 4/2013 | Shekari oreh | ............ | B61B 1/02 49/31 |
| 2015/0040480 A1* | 2/2015 | Reichling | ............ | B61B 1/02 49/24 |
| 2019/0084586 A1* | 3/2019 | Leizer | ............ | B61B 1/02 |

FOREIGN PATENT DOCUMENTS

| | | |
|---|---|---|
| CN | 2787526 Y | 6/2006 |
| CN | 101463691 A | 6/2009 |
| CN | 101468648 A | 7/2009 |
| CN | 100522713 C | 8/2009 |
| CN | 201367022 Y | 12/2009 |
| CN | 103287439 A | 9/2013 |
| JP | 2002234428 A | 8/2002 |
| JP | 2007153043 | 6/2007 |
| JP | 2007153044 | 6/2007 |
| JP | 4677441 | 4/2011 |
| JP | 2014004962 | 1/2014 |
| KR | 200273115 Y1 | 4/2002 |
| KR | 20020074358 A | 9/2002 |
| KR | 100594320 | 6/2006 |
| KR | 20130024609 | 3/2013 |
| KR | 20130024614 | 3/2013 |
| KR | 20140083135 | 7/2014 |
| WO | WO200017028 | 3/2000 |
| WO | WO2006102742 | 10/2006 |
| WO | WO2011150490 | 12/2011 |
| WO | WO2012073658 | 6/2012 |

\* cited by examiner

TRAIN PLATFORM LOCATED SECURITY SYSTEM

FIELD OF THE INVENTION

The present invention relates to the field of security systems. More particularly, the invention relates to a security system deployed in the vicinity of a train platform.

BACKGROUND OF THE INVENTION

The depth of train tracks below the platform at which passengers wait for an approaching train constitutes a serious security risk due to the possibility that one of the waiting passengers is liable to fall onto the tracks and be injured by the passing train.

It would be desirable to provide means for isolating the waiting passengers from the tracks and for permitting access to the tracks only after the train has arrived at the station and has stopped.

U.S. Pat. No. 7,721,653 discloses a static wall assembly including a segmented support frame with a rectilinear shape. The static wall assembly further includes a plurality of transparent fiberglass panels directly coupled to the support frame and spaced along an entire longitudinal length of the support frame. A mechanism automatically biases access doors between open and closed positions by means of a plurality of sensors positioned at selected portions of the wall assembly when a subway train arrives and leaves a train terminal respectively such that passengers are prohibited from premature ingress and egress of the subway train during a schedule stop.

This assembly is adapted for use in conjunction with electrically powered subway trains that stop at predetermined locations, to facilitate alignment of the access doors with a subway train. However, this static wall arrangement is insufficient for use with intercity, diesel powered trains that stop at varied or unpredictable locations within the station. Also, the train bottom is located above the platform, and there is a distinct security risk that unsuspecting passengers, especially small children, are liable fall through the opening between the train bottom and platform onto the train tracks.

U.S. Pat. No. 6,360,668 discloses a platform door system that comprises barrier elements which can be aligned along a track and/or a platform. The barrier elements can be shifted on two mutually spaced rails in both directions, a distance equal to the amount the train has missed its intended position, such that they can partially overlap with each other so that freely selectable, predetermined openings are created along the track and/or along the platform. In one embodiment, the barrier elements can be shifted orthogonally to the platform edge, and in another, the barrier elements can be pivoted or lowered.

This platform door system is complicated and therefore costly, as it requires a pair of rails parallel to the platform edge, secondary rails to enable displacement in an orthogonal direction to the platform edge, and drive means to selectively drive the barrier elements in a desired direction. Another disadvantage is that the positioning of the barrier elements in overlapping relation with each other unduly reduces the available area of the waiting room at the station. Furthermore, passengers are liable to be in mortal danger while remaining trapped between the closed barrier elements and the platform edge after the train closed its doors and before the trapped passengers were able to climb aboard.

It is an object of the present invention to provide a train platform located security system by which a single expanse of barrier elements isolate the waiting passengers at a train station from the platform edge and are also repositionable in response to a final unpredictable location along the platform edge of a train to define openings that are able to be aligned with the corresponding doors of the train.

It is an additional object of the present invention to provide a train platform located security system that minimizes the number of drive components that are needed to displace the barrier elements.

It is an additional object of the present invention to provide a train platform located security system that prevents passengers from falling through the opening between the train bottom and platform onto the train tracks.

It is yet an additional object of the present invention to provide a train platform located security system that prevents passengers from being trapped between the closed barrier elements and the platform edge.

It is yet an additional object of the present invention to provide a train platform located security system with a continuous passageway from the waiting area to an arrived train, to assist disabled passengers and passengers wheeling pieces of luggage or strollers to independently access the train without the need of climbing stairs.

Other objects and advantages of the invention will become apparent as the description proceeds.

SUMMARY OF THE INVENTION

The present invention provides a dynamic train platform located security system, comprising a single expanse of interconnectable and longitudinally displaceable, vertically disposed barrier elements for isolating a passenger waiting area at a train station from a platform edge area, said expanse including at least two longitudinally spaced portal modules for permitting passage through a central opening thereof when one or more controlled barrier elements displaceably positioned in a corresponding portal module central opening are set to an open position; and a control system for causing said single expanse to be longitudinally displaced in unison, in response to a detected stop position of a train that has arrived at said station, until each of said portal module central openings is aligned with corresponding doors of said arrived train.

As referred to herein, a "train" is a set of multicar transportation vehicles, preferably but not necessarily interconnected, which stop at varied or unpredictable locations within the station and non-limitatively include intercity trains, subway cars, trams, trolleys, monorail vehicles, light rail vehicles, wheeled vehicles, water propelled vehicles, diesel powered vehicles, and electrically powered vehicles.

The single expanse preferably includes one or more barrier units, each of said barrier units including one of the at least two longitudinally spaced portal modules, a plurality of interface barrier elements each of which longitudinally extending from a body of one of the portal modules, and a plurality of conveyed barrier elements each of which is conveyable by one of said interface barrier elements.

Each of the portal modules preferably comprises a first motor for opening and closing each of the controlled barrier elements in driving engagement therewith, a second motor by which the portal module is longitudinally displaced, a controller for controlling operation of said first and second motors, and a transceiver by which said controller exchanges data.

In one aspect, the security system further comprises coupling means for selectively and controllably coupling one of the interface barrier elements with one of the conveyed barrier elements of a same barrier unit to ensure that the barrier unit will be of a desired longitudinal length.

In one aspect, the security system further comprises a control room positioned within the train station configured with a computerized device for monitoring an instantaneous position of each barrier element of the single expanse and with a transceiver by which said computerized device exchanges data, and a train mounted transmitter for transmitting, to said computerized device, an identifying signal which is representative of door related structural information of an approaching train, when the train is within a predetermined distance from the station.

In one aspect, the computerized device is also operable to output a pre-alignment signal that is specific to each corresponding barrier unit in response to receiving the identifying signal, said pre-alignment signal being representative of a controlled action that is to be performed by the corresponding barrier unit to ensure alignment of its controlled barrier elements with doors of a given railcar of the approaching train and being transmittable by the control room transceiver to the barrier unit transceiver.

In one aspect, the control room transceiver is operable to transmit, in parallel, the outputted unit-specific pre-alignment signal to each corresponding barrier unit transceiver.

In one aspect, the computerized device is operable to sequentially generate and transmit an inter-unit coupling facilitating signal to all of the barrier unit controllers, following performance of a corresponding pre-alignment action, whereby a first interconnected barrier unit is caused to be longitudinally displaced and coupled with a second interconnected barrier unit, to ensure that an entire expanse of all of the barrier units will become interconnected.

In one aspect, the computerized device is operable to transmit an aligning initiating signal to one or more of the barrier unit controllers following performance of an inter-unit coupling operation, whereupon those barrier unit controllers that received said aligning initiating signal transmit a control signal to the corresponding second motor to cause longitudinal displacement of the entire expanse of barrier elements until a predetermined barrier related reference point becomes aligned with a train related reference point and each of the portal module central openings becomes aligned with corresponding doors of the arrived train.

In one aspect, the security system is configured with a passageway that directly extends from a corresponding portal module central opening to the arrived train, to prevent unwanted lingering of waiting passengers within a platform edge area following closing of the controlled barrier elements.

In one aspect, the passageway is defined by two partitions fixedly attached to a body of the portal module that are sufficiently long so as to extend directly to the arrived train while preventing passengers from leaving confines of the passageway prior to boarding the train, yet are sufficiently short to prevent contact with the train when moving.

In one aspect, the passageway is defined by a pivotal accession member that comprises a plurality of planar support elements over which passengers are able to walk and at least one drive unit for initiating controlled movement of components of said accession member until a most remotely disposed support element contacts a floor of a railcar which is aligned with the corresponding portal module. The accession member may further comprise longitudinally separated railing members for added protection to passengers boarding the train.

The single expanse of barrier elements vertically extending from the platform to the ceiling, when closed, facilitates conversion of the waiting area to a self-enclosed and air conditioned shopping and relaxation center that is isolated from inclement weather conditions and from polluted emissions of the diesel-powered trains. The passengers are now able to comfortably and securely sit in the waiting room or walk casually from one store to another, while being in eye contact with a portal module or with a display board of the train station indicating the arrival or departure of trains, to determine when to leave the waiting area. The surface area of the barrier elements may also be utilized for the mounting thereon of advertisements.

DETAILED DESCRIPTION OF PREFERRED EMBODIMENTS

The present invention is a novel train platform located security system that comprises a single expanse of longitudinally displaceable barrier elements for isolating passengers that are waiting for a train at a train station from the platform edge and for thereby preventing the risk of falling onto the tracks. Two types of barrier elements are provided:

controlled barrier elements which are driven and conveyed barrier elements which are conveyable by a controlled barrier element. While remaining along the single expanse, the various barrier elements are caused to be longitudinally displaced in response to instantaneous and unpredictable location data of a train incoming to the station, such that the openings which are controllably defined along the expanse are aligned with corresponding doors of the train that has arrived at the station. Other security means may also be provided for directing passengers to the train from each of the openings, to thereby eliminate any risk of passengers falling off the platform edge onto the tracks therebelow.

Figure 1:
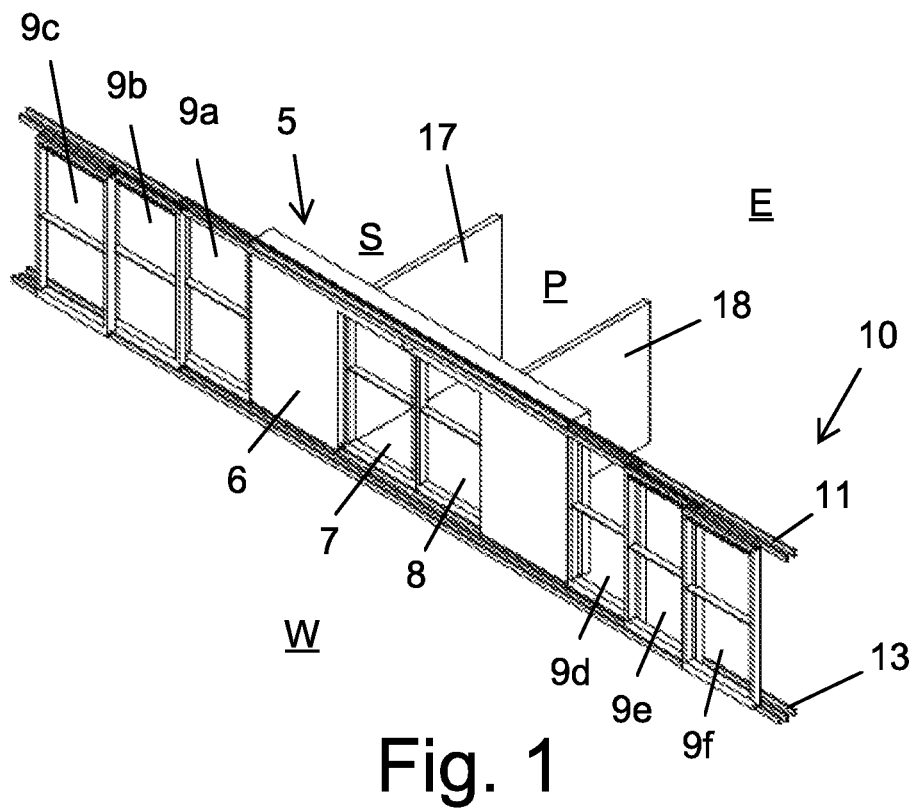
FIG. 1 is a perspective view of a barrier unit in a closed position.

FIG. 1 illustrates an expanse 10 of barrier elements constituting a single barrier unit, according to one embodiment of the invention. The barrier elements are slidably displaceable along a set of longitudinally extending upper rails 11 and lower rails 13. A portal module 5 comprises a rectilinear movable frame 6 with a central opening, and reversibly displaceable controlled barrier elements 7 and 8, generally of the center opening double door type, that are slidably engaged within the opening of portal module frame 6. Controlled barrier elements 7 and 8, shown in a closed position, are adapted to prevent passage from a passenger waiting area W to a platform edge area E, or vice versa, when set to a closed position and to permit passage therebetween when set to an open position. At each side of portal module 5 are positioned three conveyed barrier elements 9, each of which is also longitudinally displaceable.

It will be appreciated that the system of the present invention may also operate in conjunction with a plurality of sets of identical barrier elements, all of which constituting a single expanse.

To prevent unwanted lingering within area E which could lead to the trapping of passengers following the closing of controlled barrier elements 7 and 8 if the passengers did not timely climb aboard the train, two partitions 17 and 18 defining a passageway P may perpendicularly extend from body 6, for example at a corresponding edge of the central opening, to area E. Each partition is sufficiently long so as to extend directly to a train that has arrived at the station while preventing passengers from leaving the confines of passageway P prior to boarding the train, yet is sufficiently short to prevent contact with the moving train. A service area S may be delimited by one of the partitions and portal module frame 6.

Figure 2:
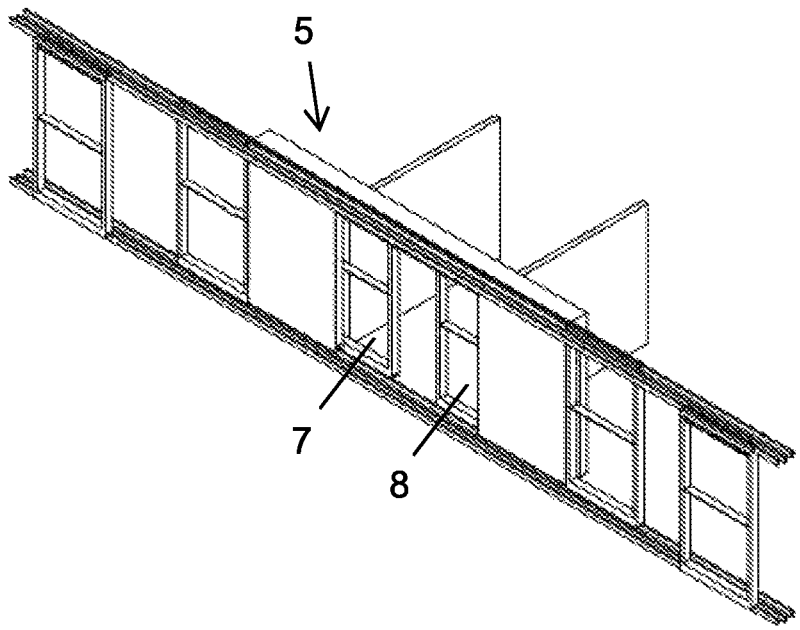
FIG. 2 is a perspective view of the barrier unit of FIG. 1 in an opened position.

FIG. 2 illustrates portal module 5 after controlled barrier elements 7 and 8 have been opened.

Figure 3:
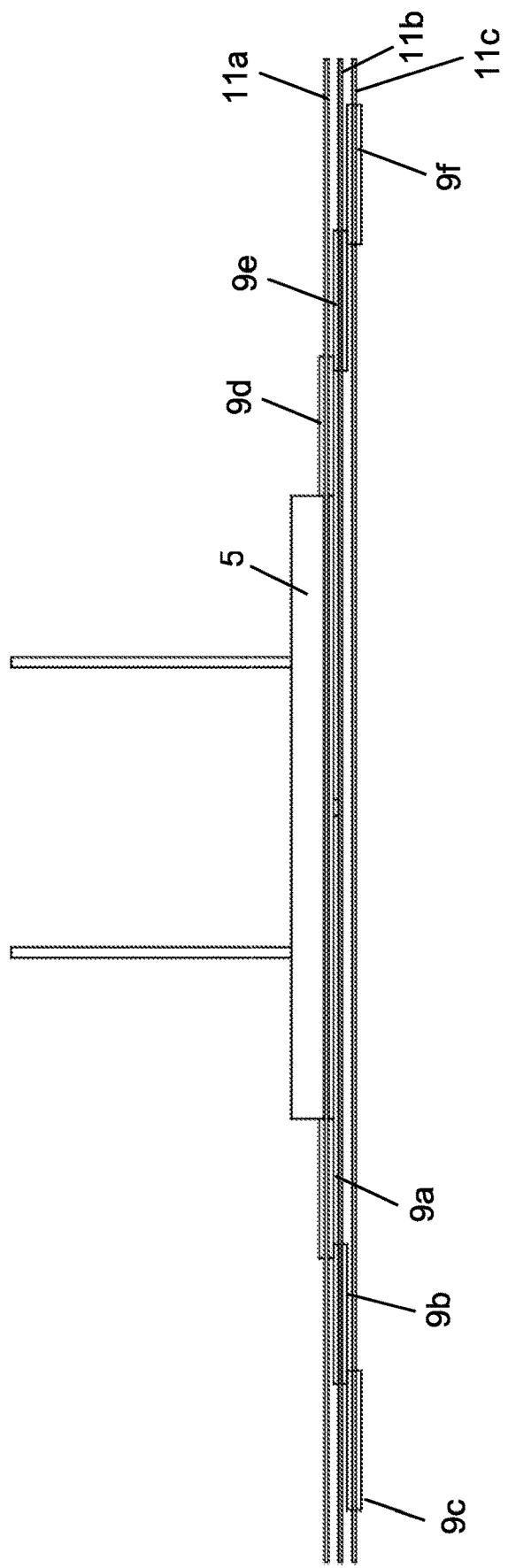
FIG. 3 is a plan view of the barrier unit of FIG. 1 in a closed position.

FIG. 3 illustrates a plan view of expanse 10, shown in a normal standby configuration. Three mutually parallel upper rails 11a-c are shown. Portal module 5 and conveyed barrier elements 9a and 9d, which are integrally formed as a monolithic unit and are therefore considered to be conveyed, are slidably engageable along rail 11a, conveyed barrier elements 9b and 9e are slidably engageable along rail 11b, and conveyed barrier elements 9c and 9f are slidably engageable along rail 11c. Barrier elements 9a and 9d longitudinally extending from the portal module body are used for coupling a conveyed barrier element, and may also be referred to as "interface barrier elements". Conveyed barrier elements 9b and 9e may also be referred as "central rail elements" and conveyed barrier elements 9c and 9f may also be referred as "inner rail elements".

Figure 4:
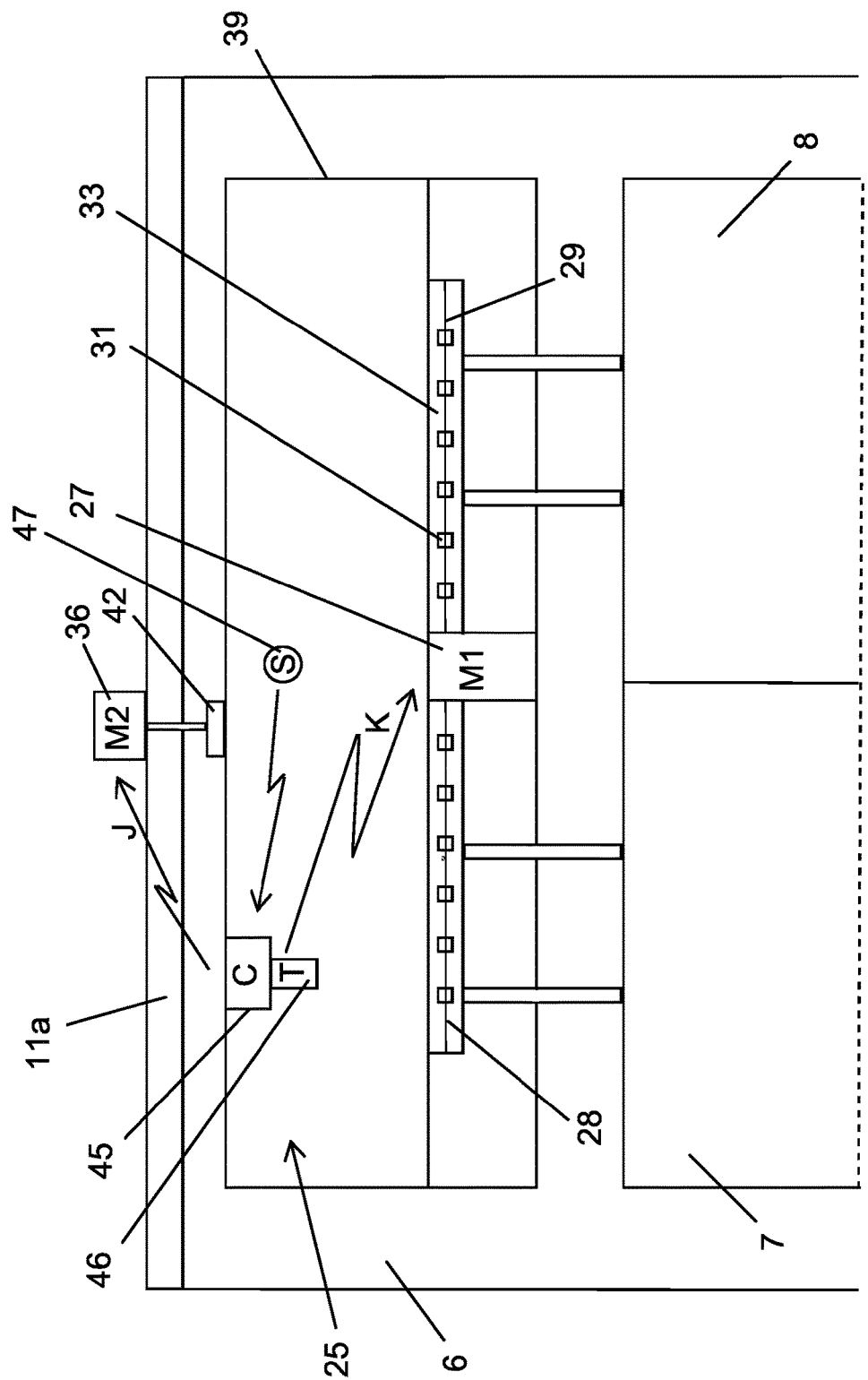
FIG. 4 is a schematic illustration of an exemplary drive mechanism used in conjunction with the barrier unit of FIG. 1.

To enable controlled longitudinal displacement of the portal module while also controllably opening the controlled barrier elements, the exemplary drive mechanism 25 schematically illustrated in FIG. 4 may be used. Housing 39 of drive mechanism 25 is generally positioned at the top of the portal module frame, but may also be positioned at the bottom thereof.

Drive mechanism 25 comprises a first electric motor 27 carried by portal module frame 6, and two oppositely displacing elements 28 and 29 driven by motor 27 and connected to controlled barrier elements 7 and 8, respectively. Driven elements 28 and 29 are engaged by a corresponding set 31 of guide rollers rotatably engaged with longitudinally extending track 33, which is attached to portal module frame 6 and is separate from rail 11a along which the portal module is displaceable. Controlled barrier elements 7 and 8 are thus suspended from track 33.

Motor 27 may have a rotatable drive shaft which is connected to a pinion gear, and the two driven elements 28 and 29 are a pair of opposed racks that intermesh with the pinion gear such that rotation of the pinion gear simultaneously drives the two racks in opposite directions. The other components of the drive mechanism are well known to those skilled in the art.

Alternatively, motor 27 may be a linear motor and the two driven elements 28 and 29 are two independently driven magnet bearing blocks which are connected to controlled barrier elements 7 and 8, respectively.

Drive mechanism 25 also comprises a second electric motor 36 for longitudinally displacing the portal module. Second motor 36 is mounted within service area S (FIG. 1), for example on the ceiling, and is kinematically connected, as well known to those skilled in the art, with a component 42 protruding from, and attached to, housing 39. Upon operation of second motor 36, a force is transmitted to component 42 which causes the portal module to be longitudinally displaced in a controlled direction.

Alternatively, second motor 36 is carried by portal module frame 6 and is kinematically connected to stationary transmission means deployed along the length of the upper rails or the lower rails. For example, a pinion gear may be mounted on the output drive shaft of second motor 36 and interengaged with a longitudinally extending rack that extends the entire length of the waiting area, so that operation of second motor 36 will cause longitudinal displacement of the portal module.

Controller 45 in data communication with both first motor 27 and second motor 36, whether wirelessly or by a flexible wired connection, and sensor 47 operable in conjunction with the control system, as will be described hereinafter, and in data communication with controller 45 are also housed in drive mechanism housing 39. Motors 27 and 36, controller 45 and sensor 47 may be powered by a battery, or alternatively by a wired connection to the electrical grid. A transceiver 46 in data communication with controller 45 is also housed in drive mechanism housing 39.

As previously explained, both the controlled barrier elements and the conveyed barrier elements are longitudinally displaceable. Even though a conveyed barrier element is generally not configured with a motor for being directly driven thereby as is a controlled barrier element, a conveyed barrier element nevertheless is able to be directed alongside the controlled barrier element when the latter is being aligned with corresponding doors of a train that has arrived at the station. In order to controllably direct a conveyed barrier element, coupling means are provided for coupling a conveyed barrier element to a controlled barrier element during an aligning operation.

Figure 5A:
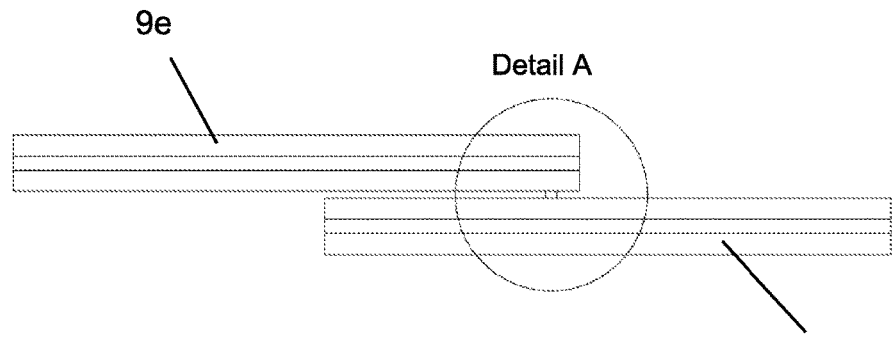
FIG. 5A is a plan view of two coupled barrier elements.
Figure 5B:
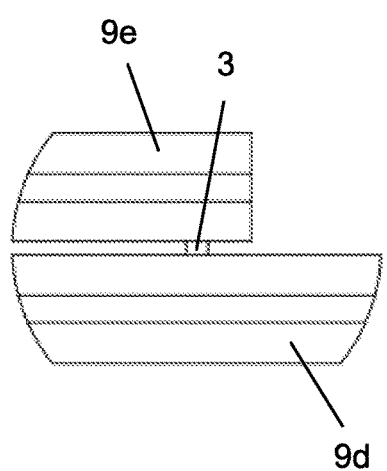
FIG. 5B is an enlargement of Detail A of FIG. 5A.
Figure 6:
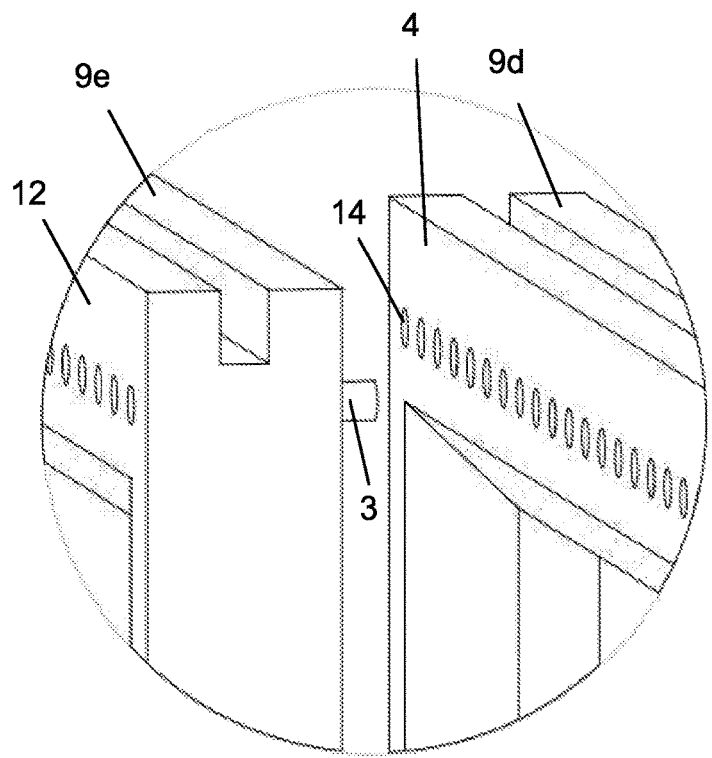
FIG. 6 is a perspective exploded view of a portion of the two barrier elements of FIG. 5A, showing coupling means in the form of an extendible pin and a plurality of seating apertures.

One type of coupling means is illustrated in FIGS. 5-6. A pin 3 substantially perpendicular to the length of conveyed barrier element 9e is shown to be coupled to a frame element 4 of interface barrier element 9d, which is shown to be separated from the portal module with which it is integrally formed for purposes of clarity. After barrier elements 9d and 9e have been coupled together, they will be displaced in unison during an aligning operation.

Frame element 4 of interface barrier element 9d is formed with a plurality of longitudinally spaced apertures 14 on the side facing conveyed barrier element 9e. In order to allow interface barrier element 9d to be displaced relative to conveyed barrier element 9e during an aligning operation, pin 3 is adapted to be selectively retractable and protrudable with respect to frame element 12 of conveyed barrier element 9e, for example in response to a wireless extension initiating signal transmitted by the drive mechanism controller to a receiver in data communication with an actuator of pin 3. Thus when interface barrier element 9d is driven, together with the portal module, to a desired location relative to conveyed barrier element 9e such that one of apertures 14 is aligned with the retracted pin 3, the extension initiating signal is transmitted and pin 3 is extended, for example by means of a solenoid based mechanism, so as to be seated within the aligned aperture 14, allowing barrier elements 9d and 9e to be subsequently displaced in unison. The opposite face of frame element 12 may be formed with a plurality of apertures to facilitate coupling with another conveyed barrier element.

It will be appreciated that pin 3 may extend from frame element 4 of interface barrier element 9d and be seated in one of a plurality of apertures 14 formed in the adjacent side of frame element 12 of conveyed barrier element 9e.

Generally, the expanse of barrier elements comprises more than one barrier unit, each of which including a portal module, a plurality of conveyed barrier elements, and a plurality of interface barrier elements. In order to couple together adjacent units, a conveyed barrier element, e.g. conveyed barrier element 9e (FIG. 3), may be provided with one or more integral interface barrier elements which longitudinally extend beyond the length of the barrier unit. During transmission of an extension initiating signal, a pin of the interface barrier element extends and is seated within an aperture formed in a conveyed barrier element, e.g. conveyed barrier element 9f, of the second barrier unit.

Figure 7:
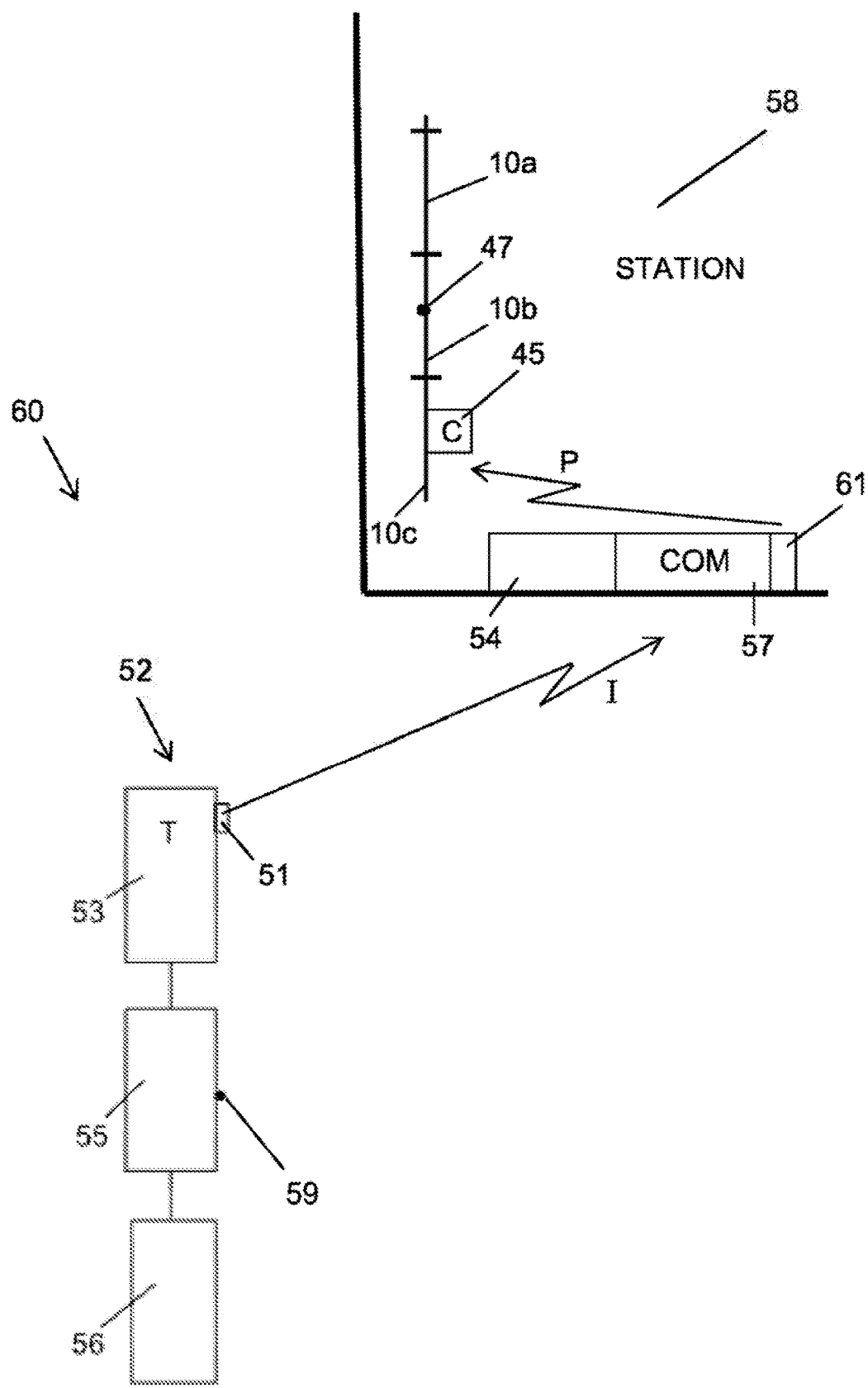
FIG. 7 is a schematic illustration of a control system according to one embodiment of the invention, shown in operation when a train is approaching a station.
Figure 8:
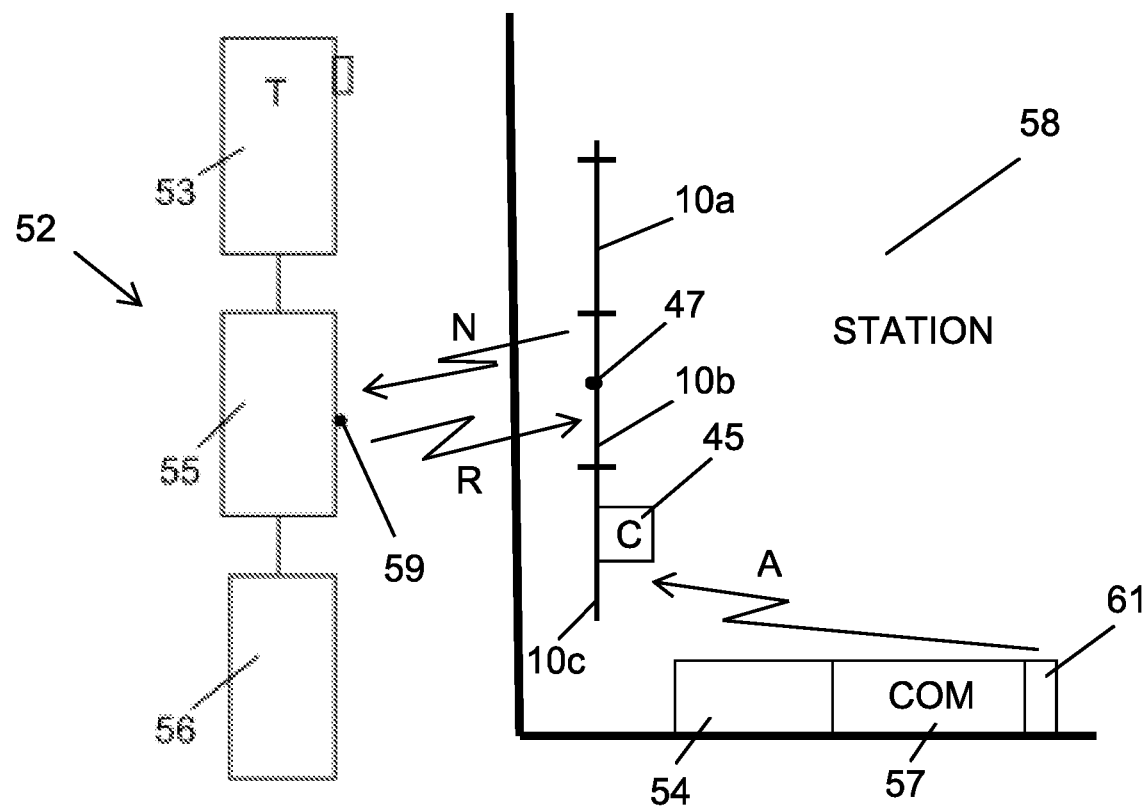
FIG. 8 is a schematic illustration of the control system of FIG. 7, shown in operation when a train has achieved a stop position.

FIGS. 7 and 8 schematically illustrate a control system 60, according to one embodiment of the invention, used for coordinating a barrier aligning operation. Control system 60 comprises a plurality of portal module motor controllers 45, sensor 47 mounted onto one of the barrier units, e.g. barrier unit 10b, sensor 59 mounted onto one of the railcars, e.g. railcar 55, of train 52, and facing station 58, and control room 54.

When train 52 approaches station 58, as shown in FIG. 7, and is within a predetermined distance therefrom, a transmitter 51 mounted on the first railcar 53 transmits a wireless identifying signal I to a control room 54 located at the entrance of station 58. Identifying signal I, which may be an infrared signal or alternatively a radio frequency (RF) signal, is representative of information regarding the door related structural information of train 52, including the length of each railcar, the relative location of the doors on a corresponding railcar, the distance from the front end of train 52 to sensor 59, the distance between each railcar, and the height of the railcar floor above the platform at station 58.

In addition to the transceiver 61 for receiving identifying signal I, control room 54 comprises a computerized device 57 on which is running a program for defining the various steps that are involved in the aligning operation. Computerized device 57 outputs a pre-alignment signal P which is representative of a controlled action that is to be performed by the barrier unit in response to the received identifying signal I. Transceiver 61 of control room 54 transmits, in parallel, a unit-specific pre-alignment signal P to the corresponding controller 45 of each barrier unit, for the performance of a preparatory alignment stage, as will be described hereinafter.

FIG. 8 illustrates train 52 after arriving at station 58 and coming to a full stop. As the final location of train 52 after coming to a full stop cannot be foreseen, sensors 47 and 59 are used to determine the stop position of the train, so that each portal module will be aligned with the doors of a corresponding railcar.

Sensor 47 periodically transmits an RW interrogating signal N, for example after the controller of unit 10b received its unit-specific pre-alignment signal. After train mounted sensor 59 receives interrogating signal N, a time dependent return signal R is transmitted in return to the controller of unit 10b, or alternatively to computerized device 57. The instantaneous location of train 52 is therefore determined by the propagation time of return signal R. When the propagation time of return signal R is found to be unchanged following two subsequently transmitted interrogating signals N, the stop position is therefore defined, whereupon computerized device 57 transmits an aligning initiating signal A to one or more of the controllers 45.

Figure 9:
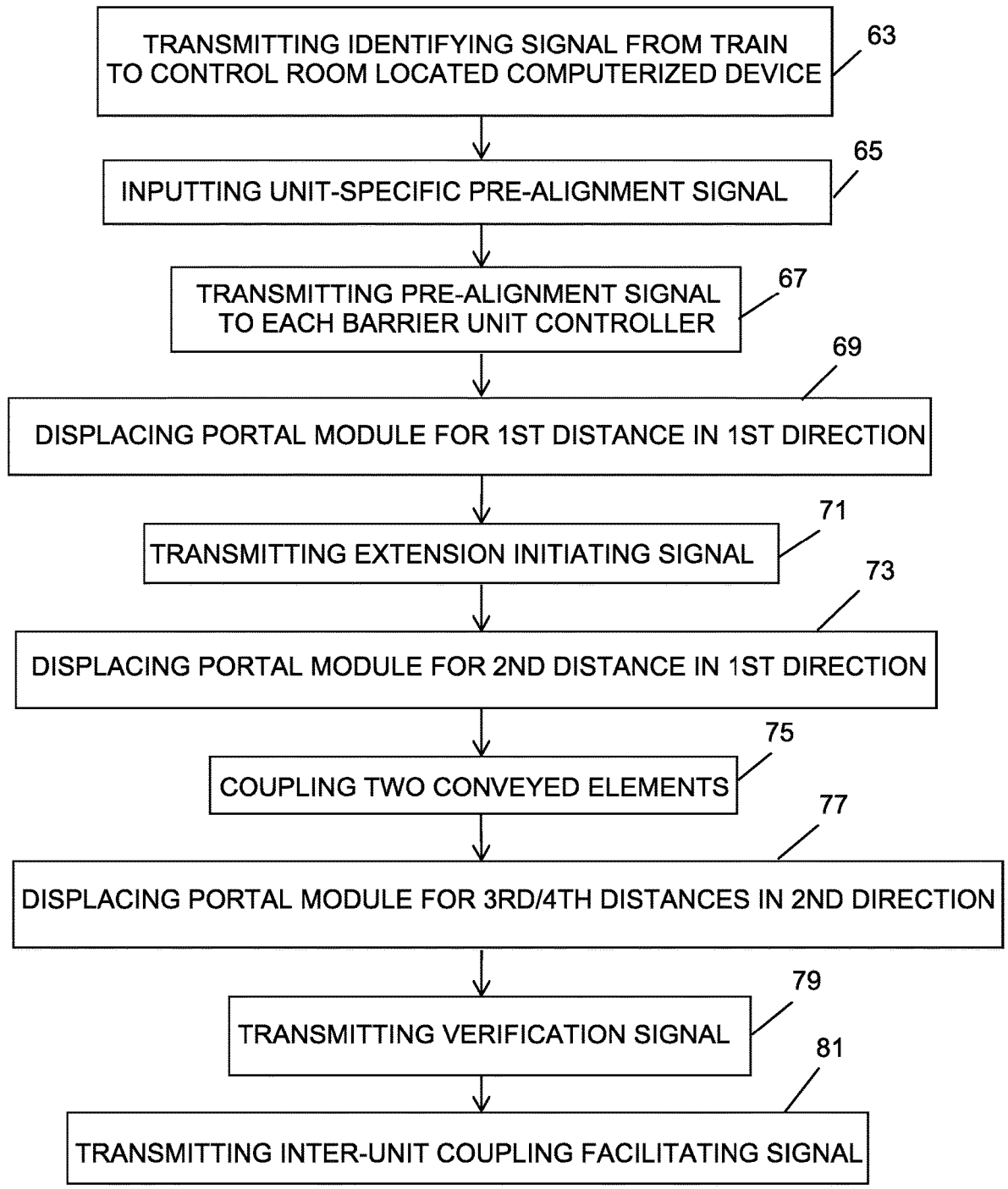
FIG. 9 is a method for performing a pre-alignment operation.
Figure 10:
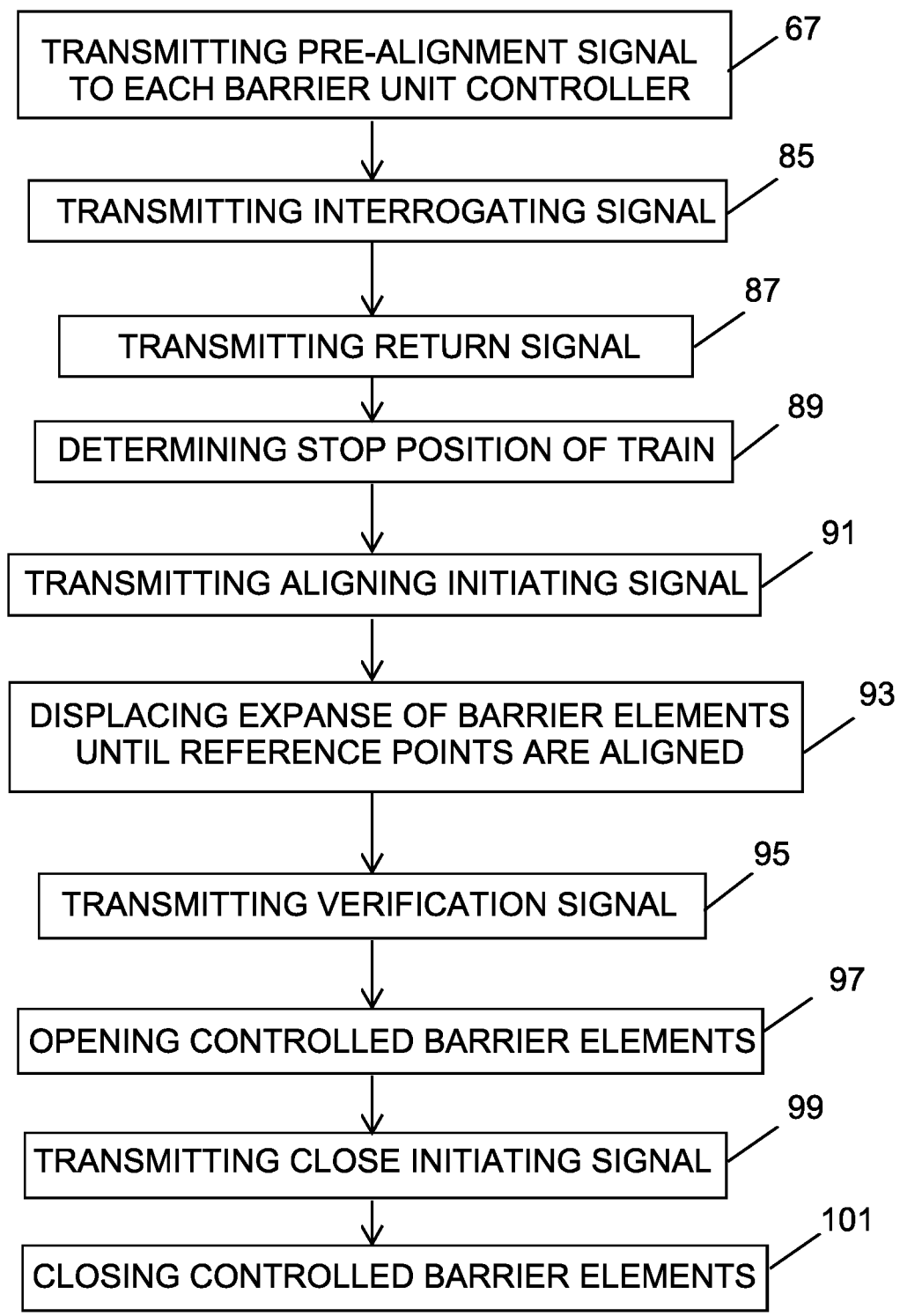
FIG. 10 is a method for performing an alignment operation.

FIGS. 9 and 10 illustrate a method for aligning the controlled barrier elements with the doors of the train at its stop position.

With reference to FIG. 9, a wireless identifying signal representative of door related structural information of an incoming train located within a predetermined distance from the entrance of a train station is transmitted in step 63 to a control room located computerized device, whereupon a preparatory alignment stage is initiated.

In the preparatory alignment stage, the computerized device outputs a unit-specific pre-alignment signal in step 65 which is representative of a controlled action that is to be performed by each barrier unit in response to the received identifying signal. The unit-specific pre-alignment signal is outputted in response to the instantaneous position of each barrier element, which is monitored by the computerized device and stored in memory. The control room transceiver in turn transmits, in parallel, the unit-specific pre-alignment signal to the controller transceiver of each corresponding barrier unit in step 67.

A pre-alignment operation is carried out while the incoming train continues to approach the station and before it comes to a full stop. More specifically, the barrier unit controller generates a first control signal J (FIG. 4) in response to the received unit-specific pre-alignment signal and transmits the same in step 69 to the second motor serving to longitudinally displace the portal module. The portal module is consequently longitudinally displaced for a sufficient first distance in a first direction such that a first interface element is suitably aligned with a first central rail conveyed element. The barrier unit controller, after receiving data indicative of the length of the longitudinal displacement for example by means of an encoder, then transmits an extension initiating signal in step 71 to the pin actuator of the first central rail conveyed element, whereupon the extended pin is seated in the selected aperture of the first interface element. A second control signal J is then transmitted by the barrier unit controller to the second motor in step 73, causing the portal module coupled with first central rail conveyed element to be longitudinally displaced a second distance in the first direction. The first central rail conveyed element is then coupled with a first inner rail conveyed element, after transmission of another extension initiating signal, in step 75.

This process is repeated in step 77 such that the portal module is subsequently displaced third and fourth distances in a second direction opposite to the first direction in order to be coupled with a second central rail conveyed element and a second inner rail conveyed element, respectively.

At the end of the pre-alignment operation, the interconnected barrier unit has the same longitudinal dimension as the corresponding distance from the set of doors of a first railcar to the set of doors of a second railcar. The barrier unit controller then transmits a verification signal in step 79 to the computerized device as indication that the pre-alignment operation has been accurately performed and that all controlled displacements are reflective of the data included in the previously transmitted pre-alignment signal. The computerized device then updates the instantaneous position of each barrier element.

Such an operation is similarly carried out in parallel for all other barrier units.

To complete the preparatory alignment stage, the computerized device sequentially transmits an inter-unit coupling facilitating signal in step 81 to all of the barrier unit controllers, whereby a first interconnected barrier unit is caused to be longitudinally displaced until a pin of one of its central rail interface barrier elements becomes aligned with an aperture formed in an inner rail conveyed barrier element of a second interconnected barrier unit, and then the pin is caused to become seated following transmission of an extension initiating signal. Thus all of the barrier units become interconnected. Another verification signal is transmitted, and the computerized device once again updates the instantaneous position of each barrier element.

FIG. 10 illustrates the alignment operation. Following transmission of the unit-specific pre-alignment signal in step 67, the single barrier mounted sensor is commanded by the controller of the barrier unit in which it is mounted to periodically transmit an RW interrogating signal in step 85. In step 87, the train mounted sensor receives the interrogating signal and transmits a time dependent return signal. The cycle continues until the computerized device determines that the train has come to a full stop and determines the stop position of the train in step 89 with reference to a predetermined reference point, such as the front of the train. The computerized device then transmits an aligning initiating signal to one or more of the barrier unit controllers in step 91, whereupon those barrier unit controllers transmit a control signal to the corresponding second motors in step 93 to cause longitudinal displacement of the entire expanse of barrier elements until a predetermined barrier related reference point becomes aligned with the train related reference point. Another verification signal is transmitted in step 95, and the computerized device once again updates the instantaneous position of each barrier element. Each barrier unit controller then transmits a control signal K (FIG. 4) to the corresponding first motor in step 97 to set the controlled barrier elements to the open position.

Once the train doors close, or following any other predetermined event, the train mounted transmitter transmits a close initiating signal in step 99 to the computerized device. The computerized device in turn commands each of the barrier unit controllers to set the corresponding controlled barrier elements to the closed position in step 101.

The pre-alignment and alignment operations are fast acting, the accumulative time being no more than 10 seconds, or even as less as 4-5 seconds.

Alternatively, the alignment operation may not be preceded by a pre-alignment operation. In this case, each barrier unit becomes interconnected, and then adjacent barrier units become interconnected, after the stop position of the train is determined.

FIGS. 11-15 illustrate another embodiment of the invention wherein controllable accession members serving as additional train platform located security means which provide a passageway directly to the railcar floor become aligned with corresponding doors of the train that has arrived at the station, to assist elderly and handicapped passengers to aboard the train.

Figure 11:
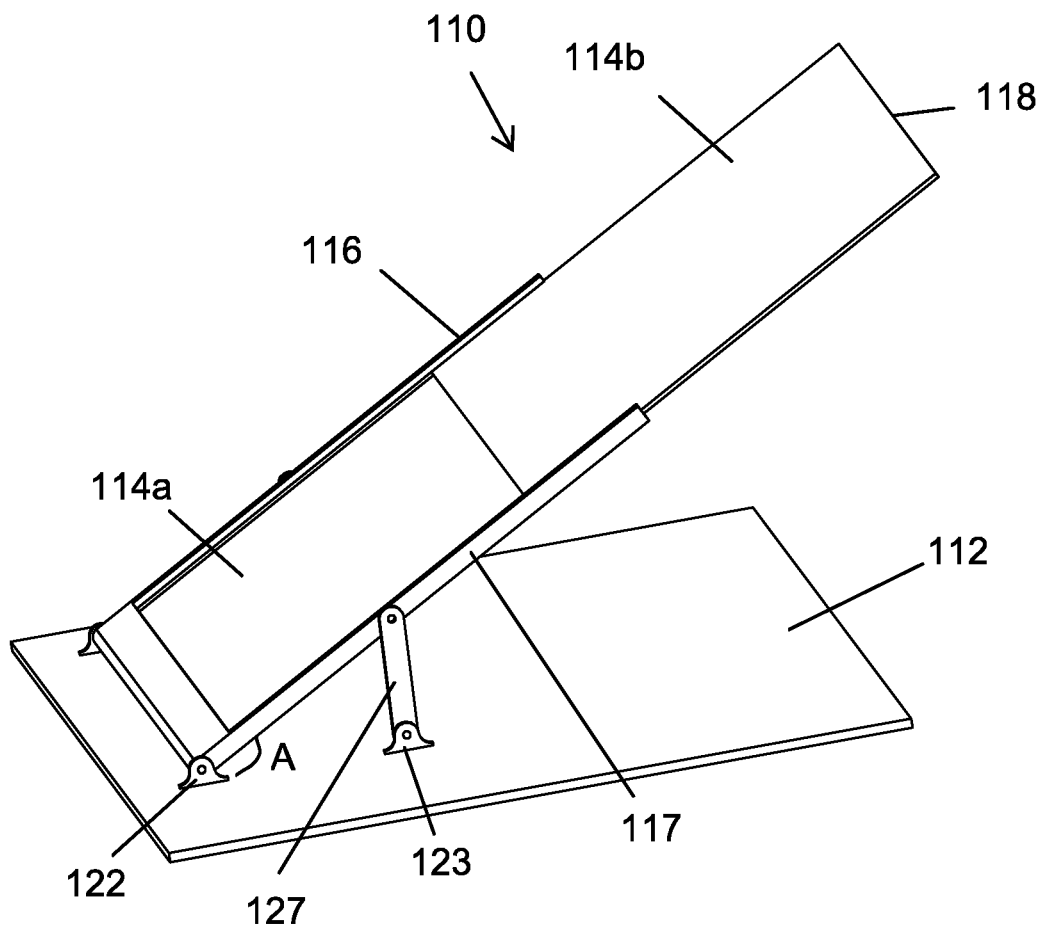
FIG. 11 is a perspective view of an accession member for providing a passageway directly to a railcar floor, when set at a standby position.

FIG. 11 illustrates an accession member 110, according to one embodiment of the invention. Side frames 116 and 117 of accession member 110 are pivotally connected by horizontally oriented pins to floor 112 of portal module 5 (FIG. 1), which may be connected to portal module frame 6 or to partitions 17 and 18. Accession member 110 also comprises a plurality of telescopingly extendable planar support elements, for example support elements 114a-b, which are retained by the opposed side frames 116 and 117 and which are sufficiently sturdy to support the weight of two or more passengers. A first pin holder 122 is connected to a floor facing end of each of side frames 116 and 117, and link 127 pivotally connected to an intermediate portion of each of side frames 116 and 117 is pivotally connected to a corresponding pin holder 123.

Accession member 110 is at first at a standby position at which the angle A between side frames 116 and 117 and floor 112 is an acute angle of at least 45 degrees, in anticipation to access an incoming train. Upon arrival of the train, accession member 110 achieves a fully angularly displaced and extended position by means of a dedicated drive unit such that the upper end 118 of support element 114b extends to the railcar floor, and passengers are able to walk along the support elements with a normal stride length directly from waiting area W (FIG. 1) to the railcar floor without having to climb steps onto the railcar floor, in similar fashion as a ramp.

Figure 12:
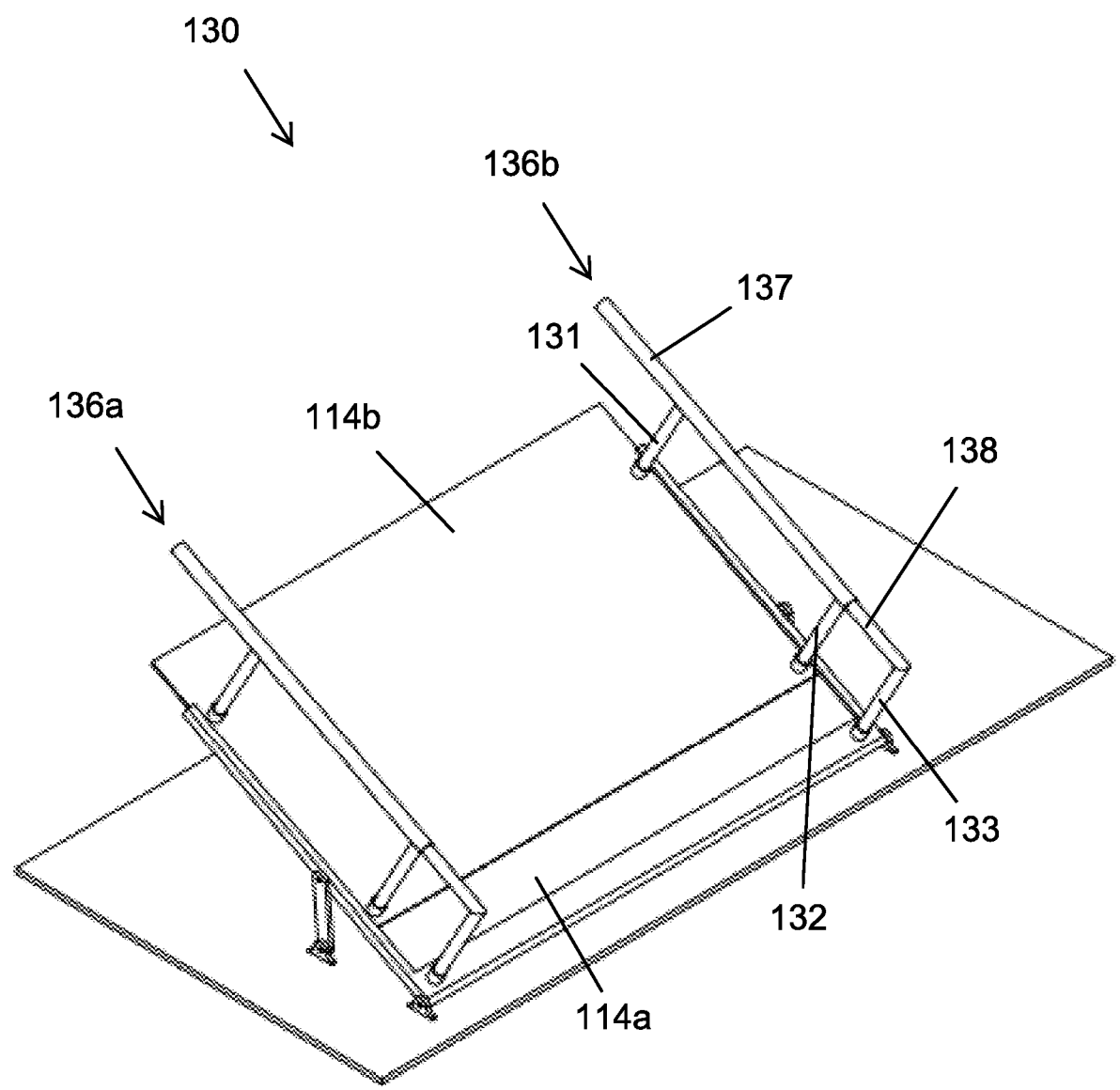
FIG. 12 is a perspective view of another embodiment of an accession member, when set at a standby position.

Accession member 130 shown in FIG. 12 has longitudinally separated railing members 136a-b, for added protection to passengers boarding a train. An exemplary railing member includes two posts 131 and 132 that extend upwardly from support element 114b, a post 133 that extends upwardly from support element 114a, a hollow railing element 137 substantially perpendicular and attached to posts 131 and 132, and railing element 138 substantially perpendicular and attached to post 133. Railing element 138 is received within the interior of railing element 137, and its graspable portion becomes increased in size when support element 114a is extended.

Figure 13:
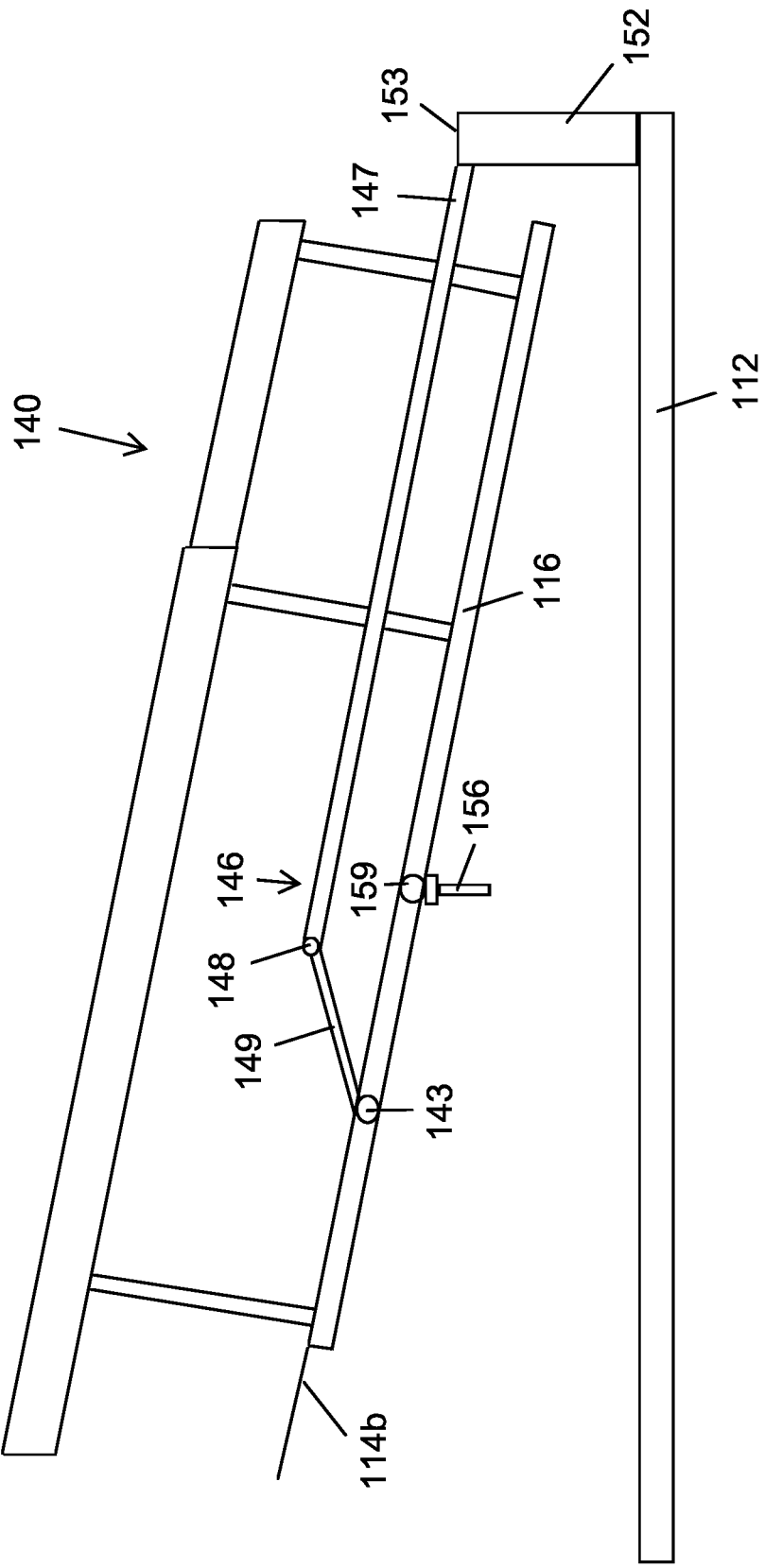
FIG. 13 is a side view of yet another embodiment of an accession member, when set at a standby position.

Alternatively, accession member 140 shown in FIG. 13 is angularly displaced by means of hydraulically driven linkage 146. Linkage 146 comprises linearly extendable rod 147 and link 149, which is pivotally connected to rod 147 by joint 148 and to side frame 116 by joint 143. Rod 147 is linearly extendable and retractable by means of a hydraulic unit, well known to those skilled in the art, which is housed in the interior of hollow step member 152 attached to, and protruding from, floor 112. Rod 147 may also be linearly extendable by means of a ball screw and an electric motor housed within step member 152. Accession member 140 preferably also comprises an extendable and retractable stabilizing unit 156 attached to side frame 116 by joint 159. Stabilizing unit 156 is driven by any suitable drive means well known to those skilled in the art such as hydraulic and electric drive means. A similar arrangement may also be provided with the other side frame to ensure proper balance.

When rod 147 is extended, a moment is transmitted to link 149, causing support elements 114a-b to pivoted about joint 143 in a clockwise direction with respect to the illustrated orientation. Rod 147 continues to be extended until support element 114a is substantially coplanar with the upper rigid surface 153 of step member 152, so that passengers, after having climbed onto step member 152, will able to walk directly from the waiting area to the railcar floor on a substantially level surface. Accession member 140 assists handicapped passengers, the elderly and children to aboard the train without having to climb any stairs and without requiring any assistance from others.

Figure 14:
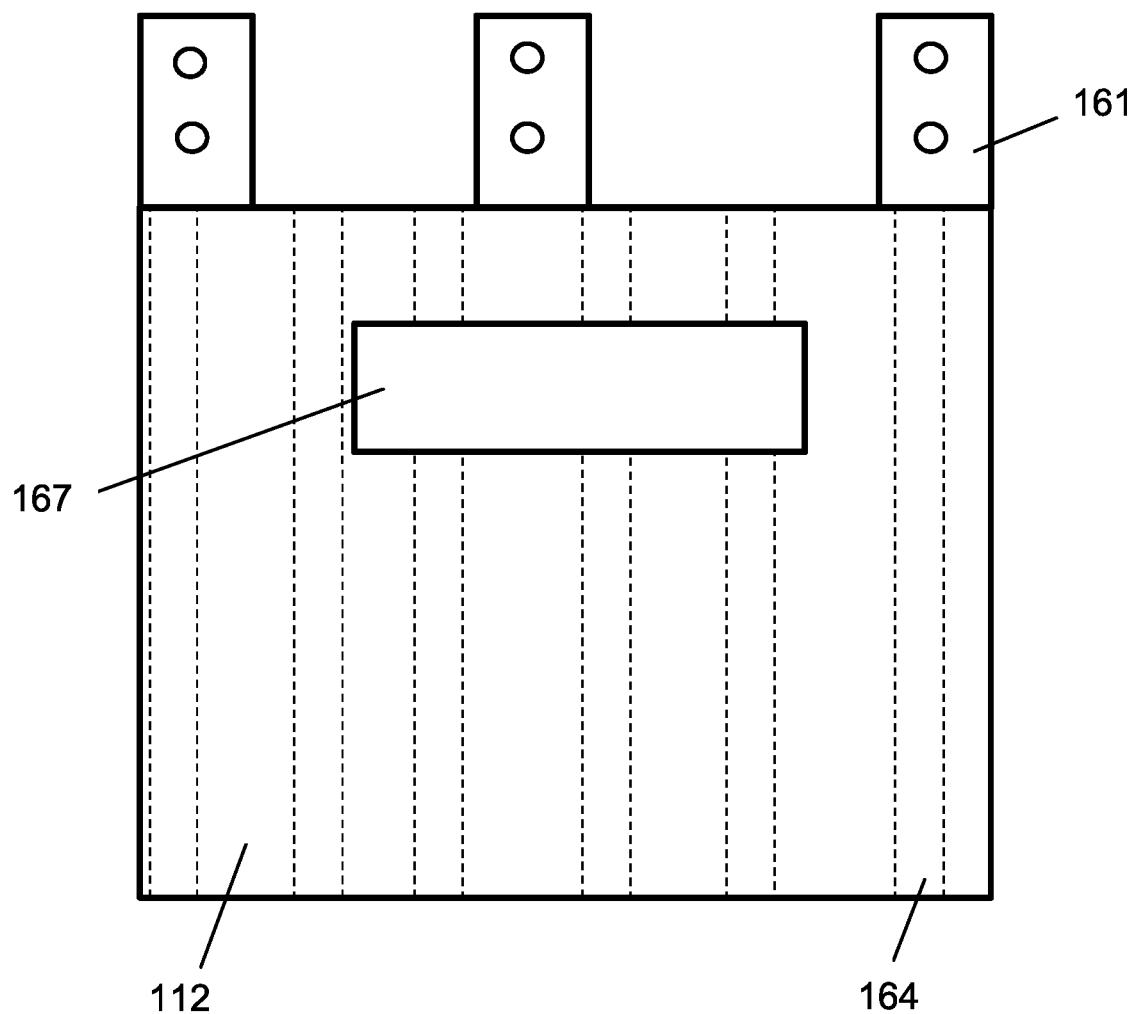
FIG. 14 is a plan view of a longitudinally displaceable floor used in conjunction with the accession member of FIG. 13.

To reduce frictional forces during longitudinal displacement of the portal modules, floor 112 connected to a portal module by a plurality of brackets 161 or any suitable connection means well known to those skilled in the art, a plurality of laterally extending rollers 164 are mounted on the underside of floor 112, as schematically illustrated in FIG. 14. Floor 112 is configured with a cutout 167, e.g. rectangularly shaped, to accommodate positioning of stabilizing unit 156 (FIG. 13) onto the platform located below floor 112 and to thereby prevent additional displacement of the floor.

Figure 15:
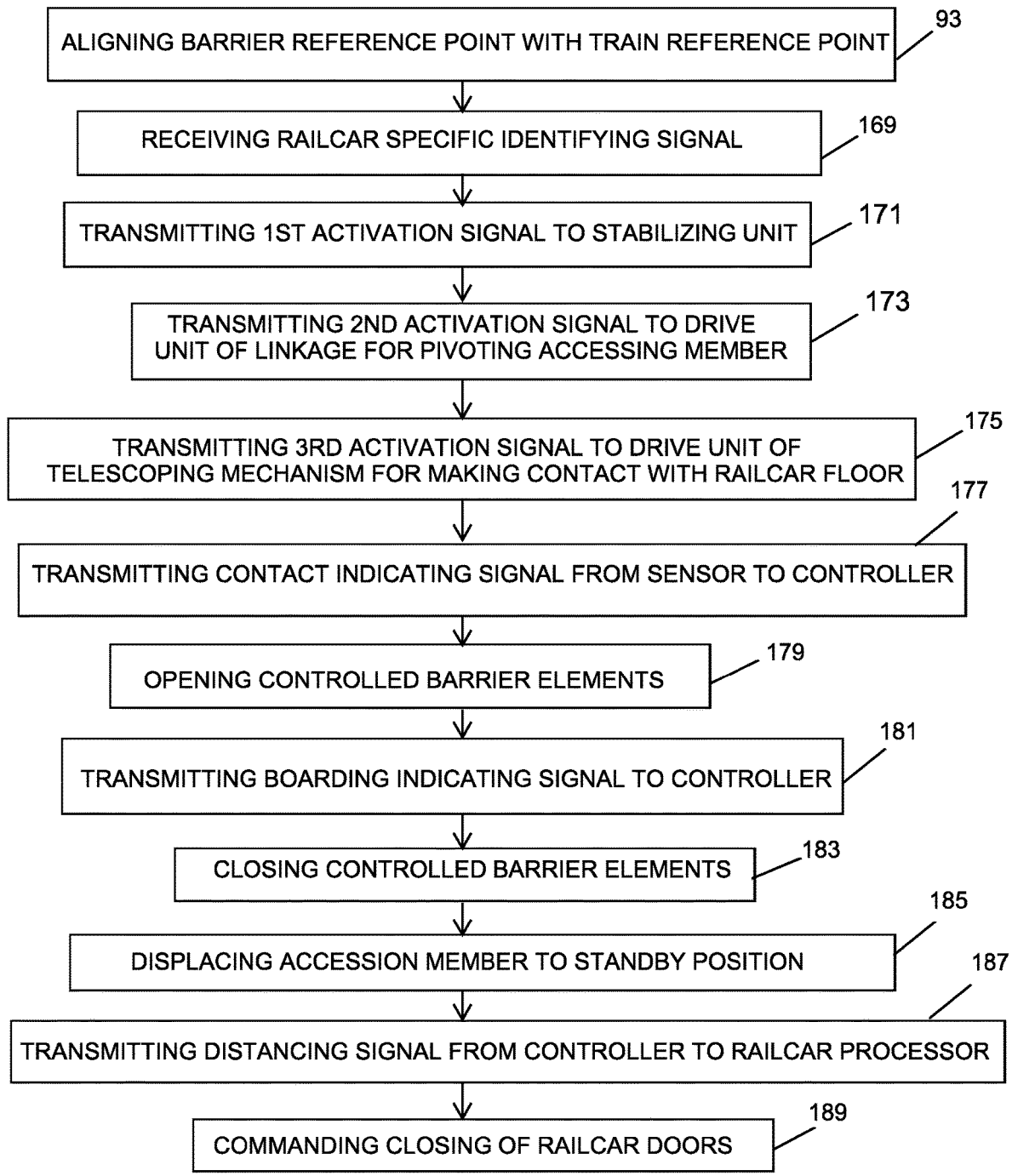
FIG. 15 is a method for deploying the accession member of FIG. 13 onto a corresponding railcar floor.

As illustrated in FIG. 15, controller 45 (FIG. 4) commands operation of the corresponding accession member after a barrier reference point has been aligned with a train reference point in step 93. Firstly, the controller receives a railcar-specific identifying signal in step 169 from the control room located computerized device 57 (FIG. 7) that is indicative of the distance from the controlled barrier elements of the corresponding portal module 5 to the aligned doors of the given railcar and the height of the railcar floor above the platform.

A first activation signal is then transmitted in step 171 to the actuator of the stabilizing unit 156, whereby a stabilizing unit element becomes suitably extended through the floor cutout and fixedly contacts the train station platform.

While this stabilizing unit element provides a reactive force, the controller transmits a second activation signal in step 173 to the actuator of the linearly extendable rod, which is part of the pivoting linkage. As the rod becomes additionally extended, the disposition of the support elements gradually and correspondingly changes by virtue of joints 143 and 159 (FIG. 13) until achieving an angle in accordance with the received railcar-specific identifying signal that permits alignment with the railcar floor.

The controller then transmits a third activation signal in step 175 to the actuator of the telescoping mechanism to initiate an extending operation in accordance with the received railcar-specific identifying signal that permits the most remotely disposed support element, e.g. support element 114b, to contact the railcar floor. When contact is made between the most remotely disposed support element and the railcar floor as detected by a sensor mounted on the support element or the railcar floor, a contact indicating signal is transmitted from the sensor to the controller in step 177. Some of the previous steps may be reversed or repeated if contact is not made between the most remotely disposed support element and the railcar floor. The controlled barrier elements are then opened in step 179 following transmission of the contact indicating signal to allow advancement of passengers directly to the railcar floor without having to climb steps.

A boarding indicating signal is transmitted in step 181 from an emitter on a railcar to the transceiver of the controller mounted in the corresponding aligned portal module after all passengers have boarded the train. The boarding indicating signal may be initiated by a crewmember of the train by pressing a button of a suitable device after making a visual inspection that all passengers have boarded. Alternatively, the boarding indicating signal may be automatically generated following the elapse of a predetermined period of time during which load sensors or the like connected to the support elements fail to detect the weight of passengers walking therealong, indicating that all waiting passengers at the given portal module have boarded the train. The controlled barrier elements are then closed in step 183 following transmission of the boarding indicating signal.

The controller commands the corresponding accession member to be displaced to the standby position in step 185 by reversing the previously mentioned steps. After the accession member has been displaced to the standby position, or after a predetermined time following initiation of the accession member based displacement operation, the portal module controller transmits a confirmation signal in step 187 to a processor of the aligned railcar to indicate that the corresponding accession member has been sufficiently spaced from the railcar floor. The railcar processor in response commands closing of the railcar doors in step 189, and then the train proceeds after all train doors have been closed.

It will be appreciated that, in one embodiment, the accession members may be controlled to be aligned with a corresponding railcar without use of portal modules and barrier elements when the controller is mounted on one element of the accession member.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A dynamic train platform located security system, comprising:
    a) a single expanse of interconnectable and longitudinally displaceable, vertically disposed barrier elements for isolating a passenger waiting area at a train station from a platform edge area, said expanse including at least two longitudinally spaced portal modules for permitting passage through a central opening thereof when one or more controlled barrier elements of the barrier elements displaceably positioned in a corresponding portal module central opening are set to an open position; and
    b) a control system for causing said single expanse to be longitudinally displaced in unison, in response to a detected stop position of a train that has arrived at said station, until each of said portal module central openings is aligned with corresponding doors of said arrived train,
wherein said single expanse includes one or more barrier units, each of said barrier units including one of said at least two longitudinally spaced portal modules, a plurality of interface barrier elements of the barrier elements, each of which longitudinally extending from a body of one of said portal modules, and a plurality of conveyed barrier elements of the barrier elements, each of which is conveyable by one of said interface barrier elements.

2. The security system according to claim 1, wherein each of the portal modules comprises a first motor for opening and closing each of the controlled barrier elements in driving engagement therewith, a second motor by which the portal module is longitudinally displaced, a controller for controlling operation of said first and second motors, and a transceiver by which said controller exchanges data.

3. The security system according to claim 2, further comprising coupling means for selectively and controllably coupling one of the interface barrier elements with one of the conveyed barrier elements of a same barrier unit to ensure that the barrier unit will be of a desired longitudinal length.

4. The security system according to claim 3, further comprising a control room positioned within the train station configured with a computerized device for monitoring an instantaneous position of each barrier element of the single expanse and with a transceiver by which said computerized device exchanges data, and a train mounted transmitter for transmitting, to said computerized device, an identifying signal which is representative of door related structural information of an approaching train, when the train is within a predetermined distance from the station.

5. The security system according to claim 3, wherein the computerized device is also operable to output a pre-alignment signal that is specific to each corresponding barrier unit in response to receiving the identifying signal, said pre-alignment signal being representative of a controlled action that is to be performed by the corresponding barrier unit to ensure alignment of its controlled barrier elements with doors of a given railcar of the approaching train and being transmittable by the control room transceiver to the barrier unit transceiver.

6. The security system according to claim 5, wherein the control room transceiver is operable to transmit, in parallel, the outputted unit-specific pre-alignment signal to each corresponding barrier unit transceiver.

7. The security system according to claim 6, wherein the computerized device is operable to sequentially generate and transmit an inter-unit coupling facilitating signal to all of the barrier unit controllers, following performance of a corresponding pre-alignment action, whereby a first interconnected barrier unit is caused to be longitudinally displaced and coupled with a second interconnected barrier unit, to ensure that an entire expanse of all of the barrier units will become interconnected.

8. The security system according to claim 6, wherein the computerized device is operable to transmit an aligning initiating signal to one or more of the barrier unit controllers following performance of an inter-unit coupling operation, whereupon those barrier unit controllers that received said aligning initiating signal transmit a control signal to the corresponding second motor to cause longitudinal displacement of the entire expanse of barrier elements until a predetermined barrier related reference point becomes aligned with a train related reference point and each of the portal module central openings becomes aligned with corresponding doors of the arrived train.

9. The security system according to claim 8, which is configured with a passageway that directly extends from a corresponding portal module central opening to the arrived train, to prevent unwanted lingering of waiting passengers within a platform edge area following closing of the controlled barrier elements.

10. The security system according to claim 1, wherein the passageway is defined by two partitions fixedly attached to a body of the portal module that are sufficiently long so as to extend directly to the arrived train while preventing passengers from leaving confines of the passageway prior to boarding the train, yet are sufficiently short to prevent contact with the train when moving.

11. The security system according to claim 10, wherein the passageway is defined by a pivotal accession member that comprises a plurality of planar support elements over which passengers are able to walk and at least one drive unit for initiating controlled movement of components of said accession member until a most remotely disposed support element contacts a floor of a railcar which is aligned with the corresponding portal module.

12. The security system according to claim 10, wherein the accession member further comprises longitudinally separated railing members for added protection to passengers boarding the train.

* * * * *